(12) United States Patent
Levy-Abegnoli et al.

(10) Patent No.: US 11,212,279 B1
(45) Date of Patent: Dec. 28, 2021

(54) MAC ADDRESS THEFT DETECTION IN A DISTRIBUTED LINK LAYER SWITCHED NETWORK BASED ON TRUST LEVEL COMPARISON

(71) Applicant: Cisco Technology, Inc., San Jose, CA (US)

(72) Inventors: Eric Michel Levy-Abegnoli, Valbonne (FR); Pascal Thubert, La Colle sur Loup (FR); Patrick Wetterwald, Mouans Sartoux (FR); Jean-Philippe Vasseur, Saint Martin d'Uriage (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 384 days.

(21) Appl. No.: 16/266,584

(22) Filed: Feb. 4, 2019

(51) Int. Cl.
*H04L 29/06* (2006.01)
*H04L 29/12* (2006.01)
*H04L 12/54* (2013.01)
*H04L 12/70* (2013.01)

(52) U.S. Cl.
CPC .......... *H04L 63/0876* (2013.01); *H04L 12/56* (2013.01); *H04L 61/2007* (2013.01); *H04L 61/6022* (2013.01); *H04L 2012/5687* (2013.01)

(58) Field of Classification Search
CPC ......... H04L 12/00; H04L 12/54; H04L 12/56; H04L 12/5601; H04L 61/00; H04L 61/20; H04L 61/2007; H04L 61/60; H04L 61/6018; H04L 61/6022; H04L 63/00; H04L 63/08; H04L 63/0876; H04L 2012/5687
See application file for complete search history.

(56) References Cited

U.S. PATENT DOCUMENTS 6,493,340 B1  12/2002  Kawanaka
8,655,312 B2   2/2014  Stahlberg et al.
9,794,176 B2  10/2017  Qiang
(Continued)

FOREIGN PATENT DOCUMENTS

CN    107547535 A     5/2018
EP      2323318 A1    5/2011

OTHER PUBLICATIONS

Jero et al., "Identifier Binding Attacks and Defenses in Software-Defined Networks", Proceedings of the 26th USENIX Security Symposium, Vancouver, BC, Canada, Aug. 16-18, 2017, pp. 415-432 (19 pages).
(Continued)

*Primary Examiner* — Boris D Grijalva Lobos
(74) *Attorney, Agent, or Firm* — Leon R. Turkevich

(57) ABSTRACT

In one embodiment, a method comprises determining, by a link layer switch within a distributed link layer switched data network, a trust metric for a media access control (MAC) address used by a network device on a link layer connection provided by the link layer switch; receiving, by the link layer switch, a query originated by a second link layer switch in the distributed link layer switched data network, the query specifying the MAC address and a corresponding specified trust metric; and responding to the query, by the link layer switch, based on determining whether the specified trust metric indicates a higher trust level than the corresponding trust metric for the MAC address used by the network device on the link layer connection.

20 Claims, 5 Drawing Sheets

(56) References Cited

U.S. PATENT DOCUMENTS

2007/0169171 A1* 7/2007 Kumar .................. H04L 63/105 726/2
2018/0332471 A1* 11/2018 Zhu ....................... H04L 63/061

OTHER PUBLICATIONS

Doyle, "An IP Address Management Solution for a Server Solution Provider", Dissertation submitted to University of Liverpool, Sep. 28, 2005, 116 pages.
Wright, "Detecting Wireless LAN MAC Address Spoofing", Jan. 21, 2003, 20 pages.
Gruteser et al., "Enhancing Location Privacy in Wireless LAN Through Disposable Interface Identifiers: A Quantitative Analysis", WMASH '03, San Diego, CA, Sep. 19, 2003, 10 pages.
Zhang et al., "Defending Against Traffic Analysis in Wireless Networks Through Traffic Reshaping", 2011 31st International Conference on Distributed Computing Systems, pp. 593-602 (11 pages).
Winter et al., "Privacy Considerations for Protocols Relying on IP Broadcast or Multicast", Internet Engineering Task Force (IETF), Request for Comments: 8386, May 2018, pp. 1-13.
Martin et al., "A Study of MAC Address Randomization in Mobile Devices and When it Fails", US Naval Academy, Mar. 31, 2017, pp. 1-23.
Vijayakumar et al., "Prevention of Multiple Spoofing Attacks with Dynamic MAC Address Allocation for Wireless Networks", IEEE, International Conference on Communication and Signal Processing, Apr. 3-5, 2014, India, pp. 1635-1639 (5 pages).
Wikipedia, "Clos Network", [online], Dec. 6, 2018, [retrieved on Dec. 11, 2018]. Retrieved from the Internet: URL: <https://en.wikipedia.org/wiki/Clos_network>, pp. 1-5.
Thubert, Ed., et al., "Address Protected Neighbor Discovery for Low-Power and Lossy Networks", [online], 6lo Internet Draft, Dec. 13, 2018, [retrieved on Dec. 20, 2018]. Retrieved from the Internet: URL: <https://tools.ietf.org/pdf/draft-ietf-6lo-ap-nd-09.pdf>, pp. 1-23.
Wikipedia, "IEEE 802.1X", [online], Oct. 22, 2018, [retrieved on Dec. 26, 2018]. Retrieved from the Internet: URL: <https://en.wikipedia.org/w/index.php?title=IEEE 802.1X&printable=yes>, pp. 1-8.
Cisco, "MAC Authentication Bypass Deployment Guide", [online], May 2011, [retrieved on Dec. 27, 2018]. Retrieved from the Internet: URL: <https://www.cisco.com/c/en/us/products/collateral/ios-nx-os-software/identity-based-networking-services/config_guide_c17-663759.pdf>, pp. 1-23.
Thubert, Ed., "Registration Extensions for IPv6 over Low-Power Wireless Personal Area Network (6LoWPAN) Neighbor Discovery", Internet Engineering Task Force (IETF), Request for Comments: 8505, [online], Nov. 2018, [retrieved on Jan. 31, 2019. Retrieved from the Internet: URL: <https://www.rfc-editor.org/rfc/pdfrfc/rfc8505.txt.pdf>, 47 pages.
U.S. Appl. No. 16/214,318, filed Dec. 10, 2018, Thubert et al.
U.S. Appl. No. 15/788,861, filed Oct. 20, 2017, Sharma et al.

* cited by examiner

MAC ADDRESS THEFT DETECTION IN A DISTRIBUTED LINK LAYER SWITCHED NETWORK BASED ON TRUST LEVEL COMPARISON

TECHNICAL FIELD

The present disclosure generally relates to a Media Access Control (MAC) address theft detection in a distributed link layer switched network based on a trust level comparison.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Various authentication protocols have been attempted to secure network devices from attacks in a data network. Link layer authentication protocols such as IEEE 802.1X have been proposed for securing a link layer (layer 2) MAC address at a local level between a network device and an authenticating device such as a link layer switch; such authentication is attempted to address problems associated with MAC address spoofing. However, data networks are encountering increasing challenges in maintaining security for network devices as the data networks are providing more complex data services such as software defined access (SDA), Digital Network Architecture (DNA), virtual machine (VM) mobility, etc. Hence, enterprise level data networks using more complex network topologies (e.g., a Clos network) can substantially limit the effectiveness of existing authentication protocols.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
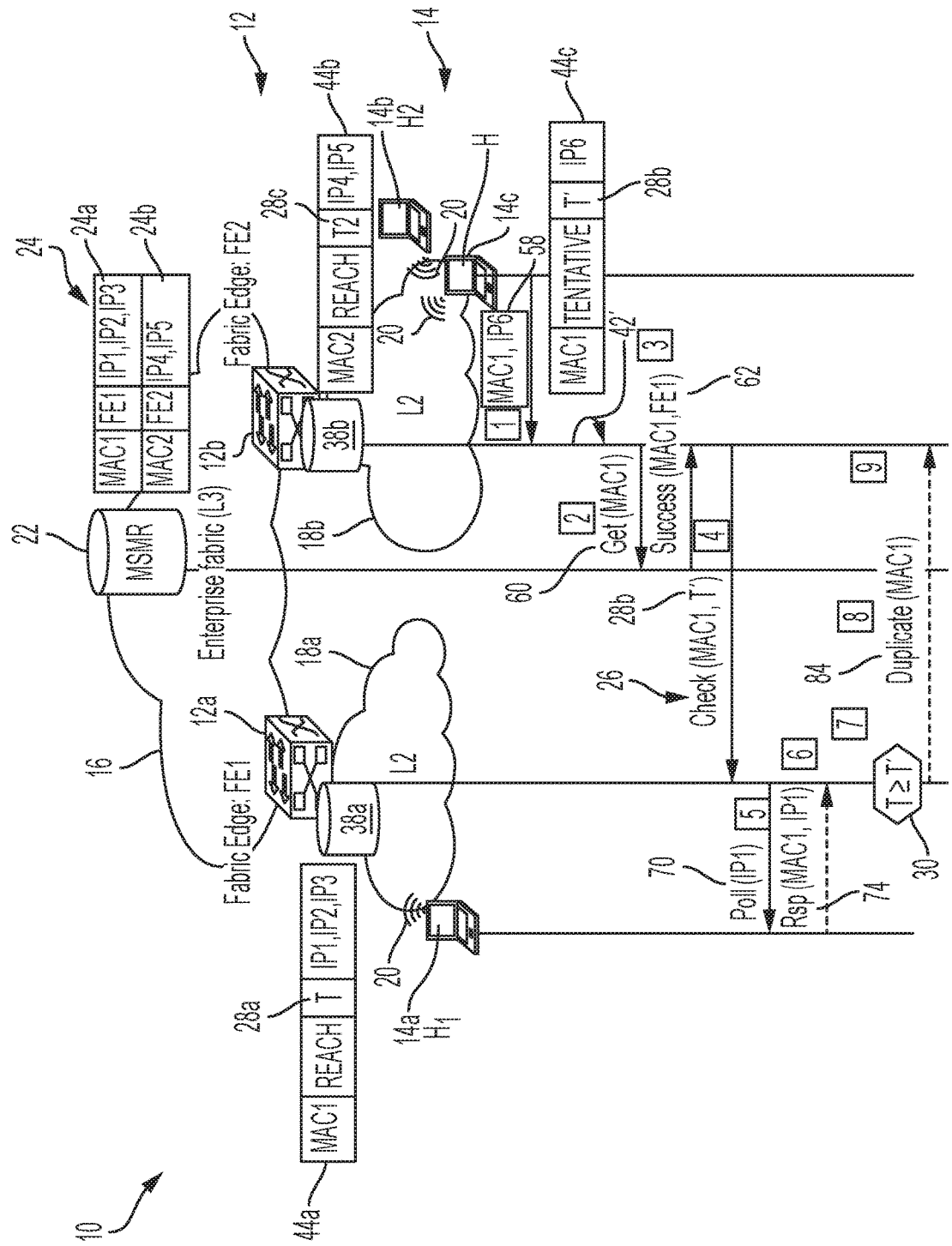
FIG. 1 illustrates an example system having an apparatus for detecting MAC address theft based on a trust level comparison, according to an example embodiment.

In one embodiment, a method comprises determining, by a link layer switch within a distributed link layer switched data network, a trust metric for a media access control (MAC) address used by a network device on a link layer connection provided by the link layer switch; receiving, by the link layer switch, a query originated by a second link layer switch in the distributed link layer switched data network, the query specifying the MAC address and a corresponding specified trust metric; and responding to the query, by the link layer switch, based on determining whether the specified trust metric indicates a higher trust level than the corresponding trust metric for the MAC address used by the network device on the link layer connection.

In another embodiment, an apparatus is implemented as a physical machine and comprises non-transitory machine readable media configured for storing executable machine readable code, a device interface circuit configured for providing a link layer connection for a network device in communication with the apparatus, and a processor circuit. The processor circuit is configured for executing the machine readable code, and when executing the machine readable code operable for: determining, by the apparatus implemented as a link layer switch within a distributed link layer switched data network, a trust metric for a media access control (MAC) address used by the network device on the link layer connection; receiving a query originated by a second link layer switch in the distributed link layer switched data network, the query specifying the MAC address and a corresponding specified trust metric; and responding to the query based on determining whether the specified trust metric indicates a higher trust level than the corresponding trust metric for the MAC address used by the network device on the link layer connection.

In another embodiment, one or more non-transitory tangible media are encoded with logic for execution by a machine and when executed by the machine operable for: determining, by the machine implemented as a link layer switch within a distributed link layer switched data network, a trust metric for a media access control (MAC) address used by a network device on a link layer connection provided by the link layer switch; receiving a query originated by a second link layer switch in the distributed link layer switched data network, the query specifying the MAC address and a corresponding specified trust metric; and responding to the query based on determining whether the specified trust metric indicates a higher trust level than the corresponding trust metric for the MAC address used by the network device on the link layer connection.

DETAILED DESCRIPTION

Particular embodiments enable an apparatus (e.g., a link layer switch) within a distributed link layer switched data network to verify ownership of a media access control (MAC) address used by a network device within the distributed link layer switched data network. The particular embodiments can execute a comparison of determined trust levels: each link layer switch in the distributed link layer switched data network can determine, for an attached network device, a corresponding trust metric for the MAC address that is used by the network device on the link layer connection provided by the link layer switch. A link layer switch can respond to a query from a second link layer switch in the distributed link layer switched data network related to a network device attempting to use the same MAC address at the second link layer switch: the link layer switch can respond to the query by determining which network device is authorized to use the MAC address, based on comparing determined trust metrics for the MAC address associated with the network devices attached at the respective link layer switches.

Hence, the example embodiments extend beyond mere detection of duplicate MAC addresses, as the example embodiments enable a link layer switch to verify MAC address ownership based on determining which of the two trust metrics (associated with the MAC address use at the respective link layer switches) indicates a higher trust level.

The comparison of trust metrics enables a link layer switch (e.g., a first link layer switch) to distinguish between: legitimate movement of a network device from the first link layer switch to the second link layer switch; improper use of the MAC address at the second link layer switch; improper use of the MAC address at the first link layer switch; a failure in updating MAC address information at a centralized database in the distributed link layer switched data network, etc.

Hence, the example embodiments enable MAC address ownership verification in a distributed link layer switched data network that provides complex data services such as software defined access (SDA), Digital Network Architecture (DNA), virtual machine (VM) mobility, etc., where the distributed link layer switched data network can utilize a complex network topology such as a Clos network utilizing multi-stage switching topologies for establishment of a "fabric" topology.

FIG. 1 is a diagram illustrating an example distributed link layer switched data network 10 having link layer switches 12 configured for verifying ownership of MAC addresses used by network devices 14, according to an example embodiment. The distributed link layer switched data network 10 can be implemented as a DNA/SDA network. The distributed link layer switched data network 10 includes interconnecting link layer switching devices (not shown) that can establish a Clos-based network fabric architecture 16. The network fabric architecture 16 can be used to establish an Internet Protocol (IP)-based network layer (Layer 3) fabric that provides an enterprise architecture without the use of any virtual local area network (VLAN) connections, hence the term "Enterprise Fabric" 16 in FIG. 1. The network fabric architecture 16 can provide end-to-end enterprise wide segmentation, flexible subnet addressing, controller-based networking with uniform enterprise wide policy and mobility.

Each link layer switch 12 (e.g., 12*a*, 12*b*) can be configured as a "fabric edge" (FE) switching device that can provide a corresponding link-layer access network 18 (e.g., 18*a*, 18*b*) for network devices (e.g., host network device "H1" 14*a*, "H2" 14*b*, "H" 14*c*) attempting to access various services in the distributed link layer switched data network 10 via wired or wireless link layer connections 20. Each link layer switch (i.e., link layer switching device) 12 can be implemented, for example, using a commercially-available Cisco Catalyst® series switch (e.g. 3000, 4000, 6000, and/or 9000 Series), from Cisco Systems®, San Jose, Calif., that is configured as described herein.

The distributed link layer switched data network 10 can include a centralized (or distributed) database 22, also referred to as a "Map Server/Map Resolver" (MSMR), that stores MAC address entries 24 registered by one or more link layer switches 12. As described in further detail below, each link layer switch 12 can send to the database 22 via the network fabric architecture 16 a MAC address entry (e.g., 24*a*) that registers a MAC address (e.g., "MAC1") used by a host network device 14 (e.g., "H1" 14*a*) with the associated link layer switch 12 (e.g., "FE1" 12*a*) further associates the registered MAC address with one or more IP addresses (e.g., "IP1", "IP2", "IP3") used by the host network device 14. Hence, the MAC address entry 24 enables the database 22 to maintain an association between a registered MAC address (e.g., "MAC1") and its associated IP addresses (e.g., "IP1", "IP2", "IP3") that are reachable via the link layer switch "FE1" 12*a* specified in the MAC address entry 24*a*.

Hence, the database 22 enables deployment of the distributed link layer switched data network 10 using the network fabric architecture 16 to provide emulation (i.e., virtualization) of link-layer (Layer 2) connectivity and link-layer extensions via the network-layer (Layer 3) network fabric architecture 16: the distributed link layer switched data network 10 can provide the link-layer virtualization in the network fabric architecture 16 without the use of any VLAN-based architecture, without the use of any spanning tree, and without the necessity of broadcast messages across the distributed link layer switched data network 10.

According to example embodiments, the link layer switches 12 can execute MAC address ownership verification in order to verify the ownership of a MAC address by a given host network device 14 across the entire distributed link layer switched data network 10. Hence, the link layer switches 12 can distinguish between a roaming host network device 14 (e.g., roaming between different link-layer access networks 18 in the distributed link layer switched data network 10) from a MAC address theft by a malicious or mis-configured host network device 14. As described in further detail below, the example embodiments enable a link layer switch (e.g., 12*b*) to respond to a detected duplicate MAC address by sending a query message 26 to another link layer switch (e.g., 12*a*) having previously registered the MAC address (e.g., "MAC1") with the database 22 (e.g., via the MAC address entry 24*a*): the link layer switch (e.g., 12*a*) can respond to the query message 26 by determining whether the network device (e.g., 14*a*) having claimed the MAC address (e.g., "MAC1") in its link-layer access network 18*a* has a higher trust metric (e.g., 28*a*) than the corresponding specified trust metric specified in the query message 26 (e.g., 28*b*); the link layer switch (e.g., 12*a*), upon comparing the respective trust metrics (e.g., 28*a*, 28*b*), illustrated as operation 30 in FIG. 1, can respond appropriately to either grant or deny use of the MAC address by the querying link layer switch "FE2" 12*b*.

Hence, the example embodiments enable link layer switches 12 to verify MAC address ownership across the distributed link layer switched data network 10, without use of any VLAN architecture or broadcast messages that may otherwise cause congestion in the network fabric architecture 16.

Figure 2:
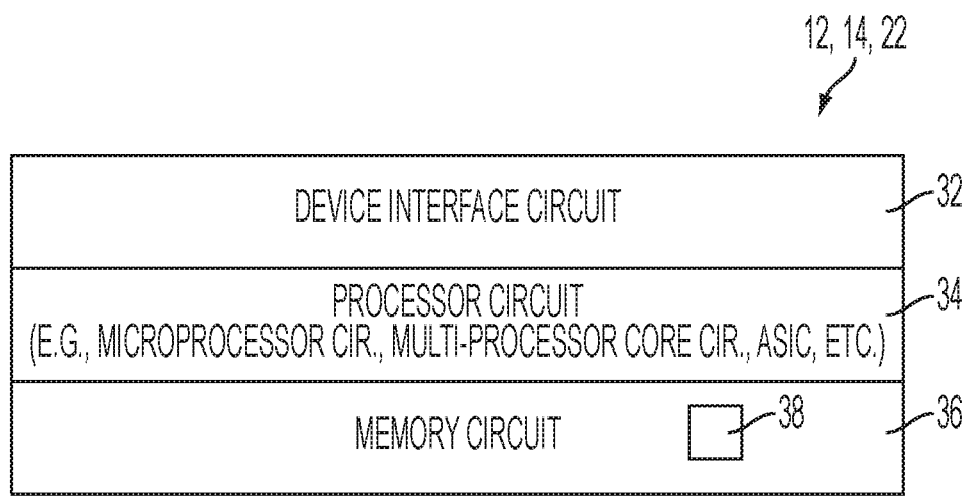
FIG. 2 illustrates an example implementation of any one of the devices of FIG. 1, according to an example embodiment.

FIG. 2 illustrates an example implementation of any one of the devices 12, 14, 22 of FIG. 1 (and any other device described herein), according to an example embodiment. The apparatus 12, 14, 22 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation. Hence, the apparatus 12, 14, 22 is a network-enabled machine implementing network communications via the network 10.

The apparatus 12, 14, 22 can include a device interface circuit 32, a processor circuit 34, and a memory circuit 36. The device interface circuit 32 can include one or more distinct physical layer transceivers for communication with any one or more of the other devices 12, 14, 22; the device interface circuit 32 also can include an IEEE based Ethernet transceiver for communications with any one or more of the devices of FIG. 1 via any type of data link (e.g., a wired or wireless link, an optical link, etc.). For example, the device interface circuit 32 of each link layer switch 12 (and each of the interconnecting link layer switching devices in the network fabric architecture 16) can include a plurality of network switch ports for switched link layer communications, at least one management port, and one or more wireless transceivers for one or more wireless data link protocols. The processor circuit 34 can be configured for executing any of the operations described herein, and the memory circuit 36 can be configured for storing any data or data packets as described herein.

Each link layer switch 12 also can be implemented as comprising a centralized switching processor circuit and a plurality of line cards, where each line card can include a corresponding device interface circuit 32 (including a plurality of switch ports), processor circuit 34, and memory circuit 36, under the control of the centralized switching processor circuit (not shown) that communicates with each of the line cards via a backplane bus. Hence, any of the operations described herein can be distributed among the different processor circuits in the line cards and the switching processor circuit, as appropriate.

Any of the disclosed circuits of the devices 12, 14, 22 (including the device interface circuit 32, the processor circuit 34, the memory circuit 36, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 36) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 36 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 36 can be implemented dynamically by the processor circuit 34, for example based on memory address assignment and partitioning executed by the processor circuit 34.

Figure 3A:
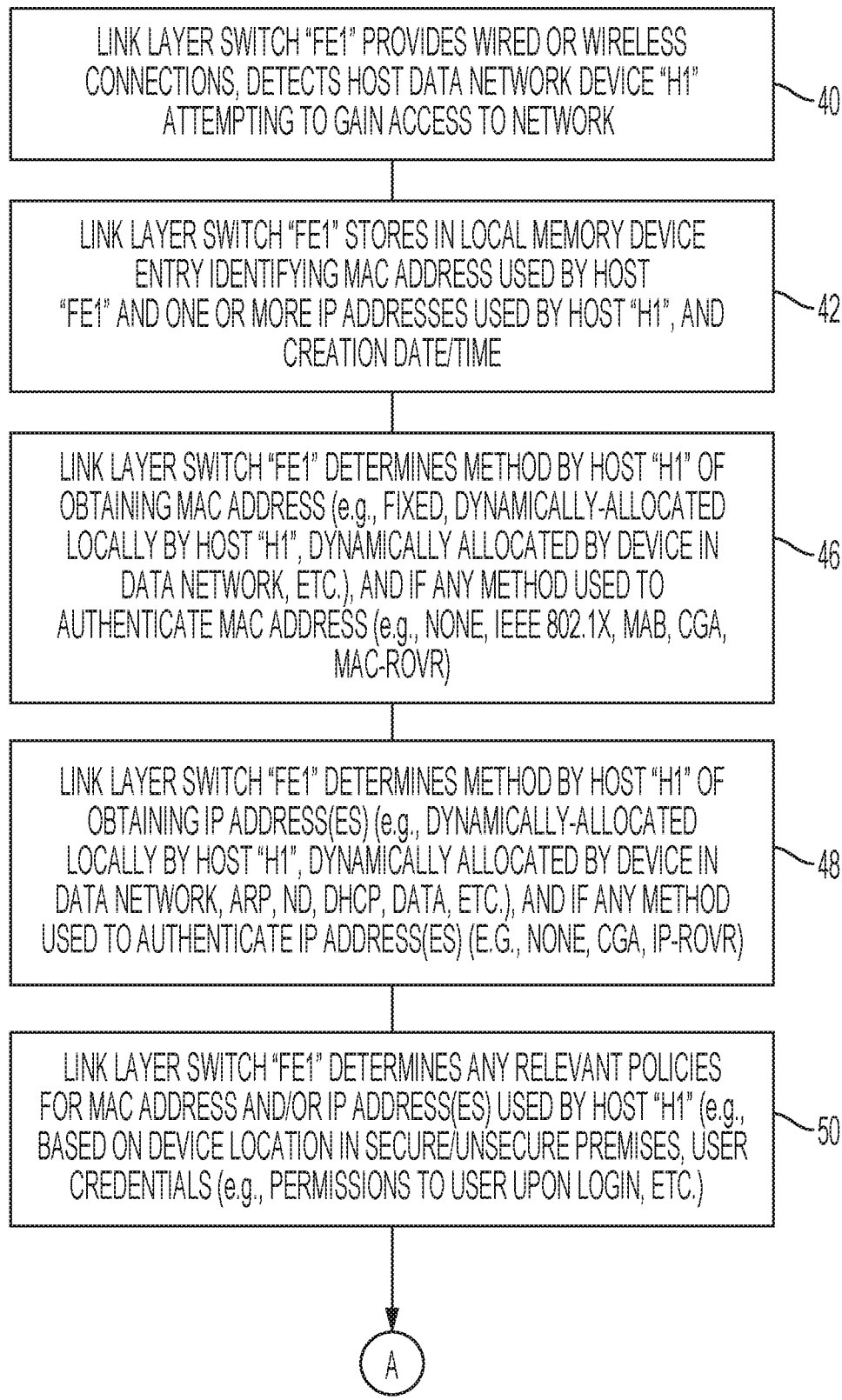
FIGS. 3A-3C illustrate an example method of detecting MAC address theft based on a trust level comparison, according to an example embodiment.
Figure 3B:
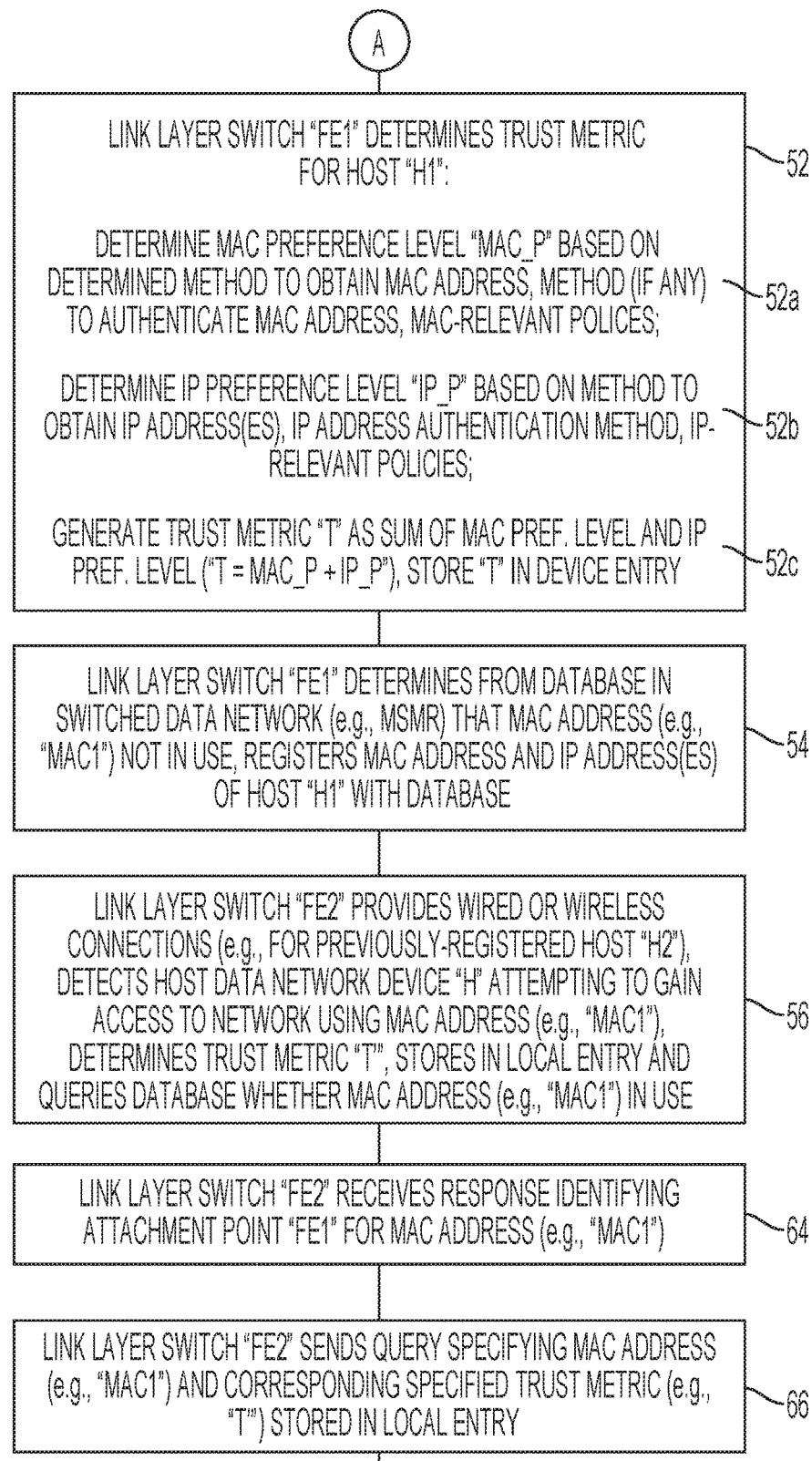
Figure 3C:
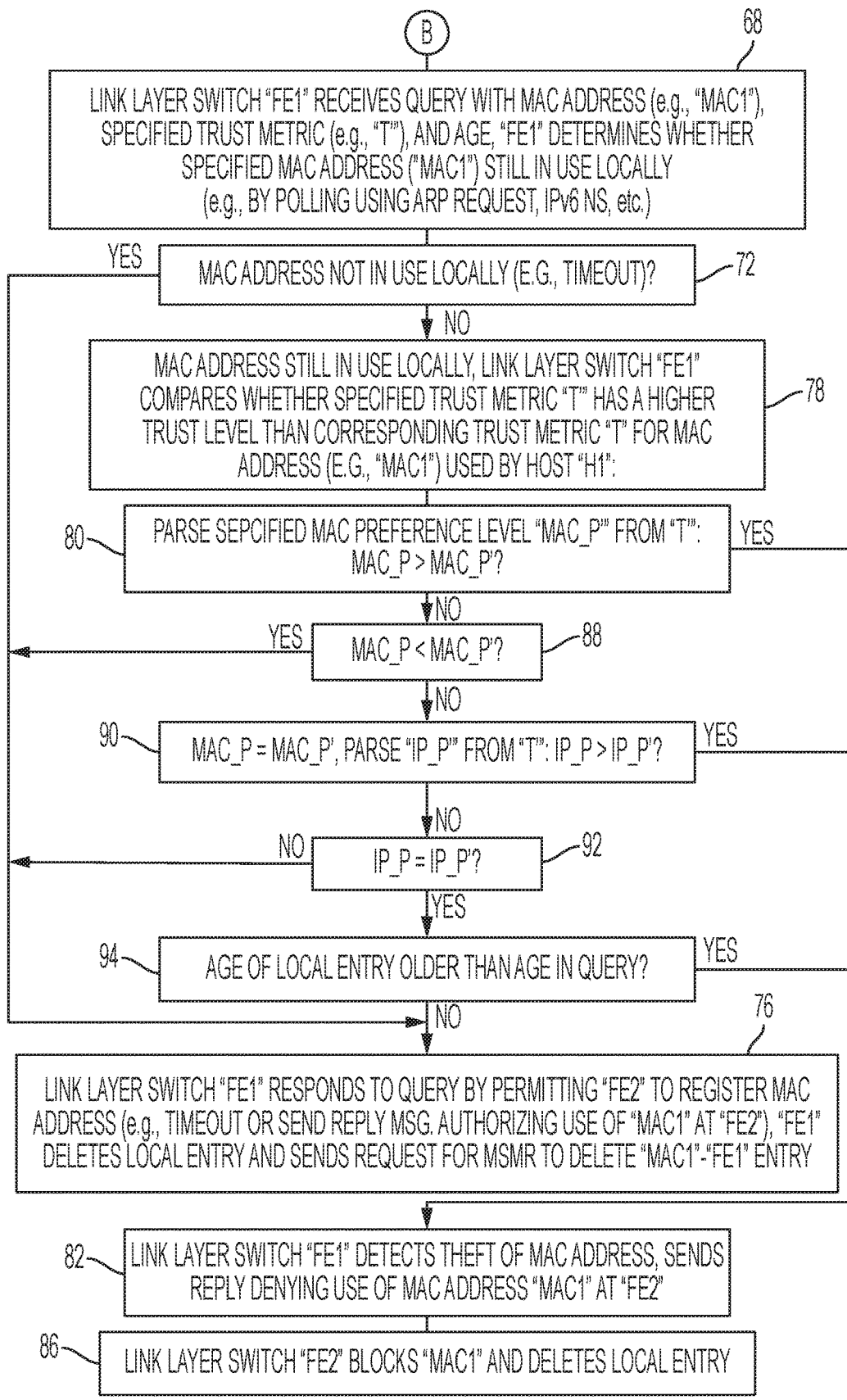

FIGS. 3A-3C illustrate an example method of detecting MAC address theft based on a trust level comparison, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 3A, the device interface circuit 32 of a link layer switch 12 (e.g., the link layer switch "FE1" 12*a*) in operation 40 can establish the link-layer access network 18*a* based on providing wired and/or wireless link-layer connections 20 for network devices 14, for example the host network device "H1" 14*a* and/or other non-host network devices in the link-layer access network 18*a* (e.g., a wireless terminal device such as a printer device, scanner device, an Internet of Things (IoT) enabled sensor or actuator device, etc.). The processor circuit 34 of the link layer switch "FE1" 12*a* (or at least the processor circuit 34 of a line card in the link layer switch "FE1" 12*a*) in operation 40 can detect that the host network device "H1" 14*a* is attempting to gain access to the distributed link layer switched data network 10 via the link-layer connection 20 provided in the link-layer access network 18*a* based on receiving a link-layer message (or IP-based message) specifying the MAC address "MAC1", and optionally one or more network level addresses (e.g., "IP1", "IP2", and "IP3"). For example the host network device "H1" 14*a* can output an Address Resolution Protocol (ARP) request or Reverse ARP request related to an IPv4 address, an IPv6 Neighbor Solicitation (NS) message, an Internet Control Message Protocol Message (ICMP), or any other message etc. Hence, the host network device "H1" 14*a* may use different IP addresses (e.g., "IP1", "IP2", and "IP3") for different operations while using the same MAC address "MAC1", enabling the processor circuit 34 of the link layer switch "FE1" 12*a* to associate the different IP addresses (e.g., "IP1", "IP2", and "IP3") with the same MAC address "MAC1".

The processor circuit 34 of the link layer switch "FE1" 12*a* in operation 42 can store in its locally-reachable neighbor table 38*a* (e.g., stored in its memory circuit 36) a neighbor device entry 44a that identifies the MAC address "MAC1" used by the host network device "H1" 14a, the different IP addresses (e.g., "IP1", "IP2", and "IP3") associated by the link layer switch "FE1" 12a during discovery operations by the host network device "H1" 14a, associated reachability for the host network device "H1" 14a (e.g., identification of network switch port, wireless Service Set Identifier (SSID), etc), and an "age" parameter (e.g., Time To Live (TTL) value) (not shown in FIG. 1) that identifies the creation date/time of the neighbor device entry 44a in the neighbor table 38a, enabling the link layer switch "FE1" 12a to determine the relative age of the link-layer connection 20 with the host network device "H1" 14a in the link-layer access network 18a.

The processor circuit 34 of the link layer switch "FE1" 12a in operation 46 initiates operations associated with determining a trust metric "T" 28a for the MAC address "MAC1" used by the host network device "H1" 14a as represented by the neighbor device entry 44a, based on determining in operation 46 how the host network device "H1" 14a obtained the MAC address "MAC1". For example, the processor circuit 34 of the link layer switch "FE1" 12a in operation 46 can determine that the host network device "H1" 14a is using its fixed (i.e., permanent) and globally-unique MAC address that was assigned (i.e., "burned-in") by the manufacturer of the device interface circuit 32 associated with the host network device "H1" 14a; the processor circuit 34 of the link layer switch "FE1" 12a in operation 46 also can determine that the MAC address was dynamically allocated by the host network device "H1" 14a, for example as part of a randomized MAC address scheme; the processor circuit 34 of the link layer switch "FE1" 12a in operation 46 also can determine that the MAC address was dynamically allocated by another network device in the distributed link layer switched data network 10, for example as part of a MAC address management scheme executed by a management device in the distributed link layer switched data network 10.

The processor circuit 34 of the link layer switch "FE1" 12a in operation 46 also can determine in operation 46 if any link layer authentication method was used before, during, or after the host network device "H1" 14a obtained the MAC address "MAC1". For example, the processor circuit 34 of the link layer switch "FE1" 12a in operation 46 can determine that no authentication method was used; the processor circuit 34 of the link layer switch "FE1" 12a in operation 46 also could determine if an IEEE 802.1X based authentication method was used by the host network device "H1" 14a (as an 802.1X supplicant) and an authentication server in the distributed link layer switched data network 10 that executes Remote Authentication Dial-In User Service (RADIUS) and/or Extensible Authentication Protocol (EAP) (in this example the link layer switch "FE1" 12a or another switching device 12 could serve as an 802.1X authenticator).

The processor circuit 34 of the link layer switch "FE1" 12a in operation 46 also could determine if MAC Authentication Bypass (MAB) was used by the host network device "H1" 14a. MAC Authentication Bypass (MAB) enables port-based access control using the MAC address of the host network device "H1" 14a. A MAB-enabled port on a network switch can be dynamically enabled or disabled based on the MAC address of the device that connects to it. In this example, the link layer switch "FE1" 12a can initiate an authentication session in response to detecting the link-layer connection 20 with the host network device "H1" 14a on an identified switch port, based on sending an Extensible Authentication Protocol (EAP) Request-Identity message to the host network device "H1" 14a. If the processor circuit 34 of the link layer switch "FE1" 12a does not receive a response, the link layer switch "FE1" 12a can retransmit the request at periodic intervals. If no response is received after the maximum number of retries, the link layer switch "FE1" 12a can permit IEEE 802.1X time out and proceed to MAB and initiate a MAC authentication with a RADIUS server in the distributed link layer switched data network 10, for example on behalf of the host network device "H1" 14a (e.g., if the host network device "H1" 14a is unable to execute IEEE 802.1X authentication).

The processor circuit 34 of the link layer switch "FE1" 12a in operation 46 also could determine if the MAC address "MAC1" was generated as a cryptographically generated address (CGA) using a private key of the host network device "H1" 14a, or whether the MAC address "MAC1" has an associated cryptographic token (Registration Ownership Verifier (ROVR)) ("MAC-ROVR") that verifies the MAC address "MAC1" is owned by the host network device "H1" 14a. The link layer switch "FE1" 12a (and/or another network device in the distributed link layer switched data network 10) can be configured for issuing a cryptographic challenge (including a nonce value) to the host network device "H1" 14a that requires the host network device "H1" 14a to prove that it generated the cryptographic "MAC-ROVR" token associated with the MAC address "MAC1": the cryptographic challenge can require the host network device "H1" 14a to cryptographically sign the nonce value in order to prove that the host network device "H1" 14a owns the corresponding private key associated with generating the cryptographic "MAC-ROVR" token. Hence, any network device can issue a challenge that forces the host network device "H1" 14a to cryptographically sign a nonce specified in the challenge in order to prove that the host network device "H1" 14a generated the cryptographic "MAC-ROVR" token. Use of a ROVR is described in further detail in the Internet Draft by Thubert et al., entitled "Address Protected Neighbor Discovery for Low-power and Lossy Networks (draft-ietf-6lo-ap-nd-09)."

The processor circuit 34 of the link layer switch "FE1" 12a in operation 48 can determine, for each IP address specified in the neighbor device entry 44a as having been used by the host network device "H1" 14a, a corresponding assignment method used by the host network device "H1" 14a in obtaining the corresponding IP address. For example, the processor circuit 34 of the link layer switch "FE1" 12a can determine in operation 48 whether the host network device "H1" 14a acquired any of its IP addresses (as specified in the neighbor device entry 44a) using its own dynamic allocation, whether the host network device "H1" 14a obtained a corresponding IP address based on a dynamic allocation with another network device in the distributed link layer switched data network 10 (e.g., ARP, IPv6 Neighbor Discovery (ND), DHCP, based on other data supplied by another network device, etc.).

The processor circuit 34 of the link layer switch "FE1" 12a in operation 48 also can determine if there is an identification of any network layer authentication method for any of the IP addresses specified in the neighbor device entry 44a. For example, the processor circuit 34 of the link layer switch "FE1" 12a in operation can determine whether any one or more of the IP addresses specified in the neighbor device entry 44a are authenticated using a cryptographically-generated IP address, or whether any IP address is authenticated relative to an IP-based cryptographic ROVR token ("IP-ROVR"). As described above, an IP-based cryptographic ROVR token "IP-ROVR" can be associated with a corresponding IP address, enabling a network device to issue a cryptographic challenge (including a nonce) to prove that the host network device 14 generated the cryptographic ROVR token "IP-ROVR" associated with the IP address. The challenge can require the host network device "H1" 14*a* to cryptographically sign the nonce value in order to prove that the host network device "H1" 14*a* owns the corresponding private key associated with generating the cryptographic "IP-ROVR" token associated with an IP address (as opposed to a "MAC-ROVR" that is distinct from the "IP-ROVR" token). Hence, any network device can issue a challenge that forces the host network device "H1" 14*a* to cryptographically sign a nonce specified in the challenge in order to prove that the host network device "H1" 14*a* generated the cryptographic "IP-ROVR" token (additional details are found in the Internet Draft by Thubert et al.).

The processor circuit 34 of the link layer switch "FE1" 12*a* in operation 50 also can determine any link-layer policy attributes associated with the host network device "H1" 14*a* connecting to the link-layer access network 18*a*, or any network-layer policy attributes associated with the host network device "H1" 14*a* connecting to the link layer switch "FE1" 12*a*. Example link-layer and/or network-layer policy attributes can be based on, for example device location (e.g., whether the link layer switch "FE1" 12*a* and/or the host network device "H1" 14*a* is within a physically secure location in a building that has restricted access to authorized individuals/entities), user credentials (e.g., successful user login and permissions levels depending on user authorization, etc.), prescribed MAC address—IP address associations, etc.

Referring to FIG. 3B, the processor circuit 34 of the link layer switch "FE1" 12*a* in operation 52 can determine the trust metric "T" 28*a* for MAC address "MAC1" used by the host network device "H1" 14*a*. For example, the processor circuit 34 of the link layer switch "FE1" 12*a* in operation 52*a* can generate a MAC preference level "MAC_P" based on identifying from operation 46 the determined method used to obtain the MAC address, the determined method (if any) to authenticate the MAC address "MAC1", and based on identifying from operation 50 any link-layer policy attributes associated with the host network device "H1" 14*a* connecting to the link layer switch "FE1" 12*a* via the link-layer connection 20 in the link-layer access network 18*a*.

The processor circuit 34*a* of the link layer switch "FE1" 12*a* in operation 52*b* also can generate an IP preference level "IP_P" based on identifying from operation 48 the determined assignment method used for obtaining the IP addresses, an identification of any network layer authentication method for the IP addresses, and based on identifying from operation 50 any network-layer policy attributes associated with the host network device "H1" 14*a* connecting to the link layer switch "FE1" 12*a* via the link-layer connection 20 in the link-layer access network 18*a*. The processor circuit 34 of the link layer switch "FE1" 12*a* in operation 52*b* can store the highest IP preference level from among the multiple IP addresses "IP1", "IP2", and "IP3" used by the host network device "H1" 14*a* (as specified in the neighbor device entry 44*a*).

The processor circuit 34*a* of the link layer switch "FE1" 12*a* in operation 52*c* can generate the trust metric "T" 28*a* as a sum of the MAC preference level "MAC_P" and the (highest) IP preference level "IP_P", and store the trust metric "T" 28*a* in the neighbor device entry 44*a*. The processor circuit 34*a* of the link layer switch "FE1" 12*a* also can store in the neighbor device entry 44*a* with respect to the trust metric "T" 28*a* the associated MAC preference level "MAC_P" and IP preference level "IP_P" for the host network device "H1" 14*a*, enabling the link layer switch "FE1" 12*a* to compare trust levels based on respective MAC preference levels and IP preference levels, described below.

The processor circuit 34*a* of the link layer switch "FE1" 12*a* in operation 54 can send a query to the database 22 to determine whether the MAC address "MAC1" is in use in the distributed link layer switched data network 10: in response to determining from the database 22 that the MAC address "MAC1" is not yet in use in the distributed link layer switched data network 10, the processor circuit 34 of the link layer switch "FE1" 12*a* in operation 54 can register the MAC address "MAC1" and the associated IP addresses "IP1", "IP2", and "IP3" used by the host network device "H1" 14*a* by sending the MAC address entry 24*a* to the database 22, enabling the database 22 to identify that the "MAC1" and the associated IP addresses "IP1", "IP2", and "IP3" are used by the host network device "H1" 14*a* via the link layer switch "FE1" 12*a*.

Hence, any network device in the distributed link layer switched data network 10 can determine from the database 22 that the "MAC1" and the associated IP addresses "IP1", "IP2", and "IP3" are used by the host network device "H1" 14*a* via the link layer switch "FE1" 12*a*.

Referring to operation 56 of FIG. 3B, the second link layer switch "FE2" 12*b* of FIG. 1 provides a different and distinct link-layer access network 18*b*, for example at a different geographical area or administrative area than the link-layer access network 18*a* provided by the link-layer access network 18*a*, and otherwise executes the same operations in operation 56 as described previously with respect to the link layer switch "FE1" 12*a* in operations 40 through 56. Hence, the link layer switch "FE2" 12*b* executes the same operations of: providing link-layer connections 20 for the host network devices 14*b* and 14*c* via the link-layer access network 18*b* (as in operation 40); creating and storing a neighbor device entry 44*b* for the host network device "H2" 14*b* that includes a corresponding age metric and trust metric "T2" 28*c* determined by the link layer switch "FE2" 12*b* (as in operations 42 through 52) for the corresponding MAC address "MAC2" used by the link layer switch "FE2" 12*b*; and registering the MAC address "MAC2" and associated IP addresses "IP4" and "IP5" (as specified in the neighbor device entry 44*b*) in the database 22 in response to determining from the database 22 that MAC address "MAC2" is not used in the distributed link layer switched data network 10, for example based on forwarding a MAC address entry 24*b* specifying the MAC address "MAC2" and associated IP addresses "IP4" and "IP5" are reachable via the link layer switch "FE2" 12*b* (as in operation 54).

Similarly, the link layer switch "FE2" 12*b* in operation 56 also can detect the host network device "H" 14*c* transmitting a data packet 58 specifying the MAC address "MAC1" and an IP address "IP6" (operation "1" of FIG. 1), and in response create a tentative neighbor device entry 44*c* (operation 42' of FIG. 1) in its neighbor table 38*b*; the link layer switch "FE2" 12*b* in operation 56 also can generate and add to the neighbor device entry 44*c* a corresponding trust metric "T'" 28*b* (as in operations 46 through 52). The trust metric "T'" 28*b* stored in the neighbor device entry 44*c* also can specify as separate components the associated MAC preference level "MAC_P'" and the IP preference level "IP_P'" determined by the link layer switch "FE2" 12*b* for the MAC address "MAC1" used by the host network device "H" 14*c* via the link-layer connection 20 in the link-layer access network 18*b*. The link layer switch "FE2" 12*b* in operation 56 also can send an MSMR query message (60 of FIG. 1) (operation "2" of FIG. 1) to determine whether the MAC address "MAC1" is already in use in the distributed link layer switched data network 10.

The database 22 can respond to the MSMR query message 60 by detecting the MAC address entry 24a that specifies the MAC address "MAC1" is reachable via the link layer switch "FE1" 12a, and in response the database 22 can send to the link layer switch "FE2" 12b a MSMR Success Message (62 of FIG. 1) specifying the MAC address "MAC1" is reachable via the link layer switch "FE1" 12a (operation "3" of FIG. 1).

In response to the link layer switch "FE2" 12b receiving in operation 64 the MSMR Success Message 62 indicating the MAC address "MAC1" is already in use in the distributed link layer switched data network 10, the link layer switch "FE2" 12b in operation 66 generates and sends to the link layer switch "FE1" 12a identified in the MSMR Success Message 62 a query message 26. The query message 26 specifies the MAC address "MAC1" and the specified trust metric "T'" 28b (including the associated MAC preference level "MAC_P'" and the IP preference level "IP_P'") (operation "4" of FIG. 1). Although not shown in FIG. 1, the query message 26 also can specify the "age" parameter (e.g., Time To Live (TTL) value) that identifies the creation date/time of the neighbor device entry 44c in the neighbor table 38b.

Referring to FIG. 3C, the device interface circuit 32 of the link layer switch "FE1" 12a in operation 68 receives via the network fabric architecture 16 the query message 26 specifying the MAC Address "MAC1", the trust metric "T'" 28b (including the associated MAC preference level "MAC_P'" and the IP preference level "IP_P'"), and the corresponding age parameter indicating the creation date/time of the neighbor device entry 44c in the neighbor table 38b. The processor circuit 34 of the link layer switch "FE1" 12a, in response to reception of the query message 26 in operation 68, determines whether the MAC address "MAC1" is still in use locally in the link-layer access network 18a, for example by polling the host network device "H1" 14a based on outputting a poll message 70 (operation "5" in FIG. 1); the link layer switch "FE1" 12a also can determine in operation 72 that the MAC address "MAC1" is still in use in response to detecting a data packet transmitted from the host network device "H1" 14a within a prescribed time interval (e.g., within 200 milliseconds), eliminating the necessity of the poll message 70 (it is expected that normal roaming and registration at another link layer access network 18 by a host network device 14 would require greater than the prescribed time interval, such that a roaming network device 14 example would involve the link layer switch "FE1" 12a outputting a poll message 70).

If in operation 72 the link layer switch "FE1" 12a does not receive within a prescribed time interval a response 74 from the host network device "H1" 14a (operation "6" of FIG. 1), the processor circuit 34 of the link layer switch "FE1" 12a can determine in operation 76 that the MAC address "MAC1" is no longer in use (by link layer switch "FE1" 12a) in the link-layer access network 18a (e.g., if the host network device "H1" 14a has moved from the link-layer access network 18a to the link-layer access network 18b), and in response send to the link layer switch "FE2" 12b a reply that authorizes use of the MAC address "MAC1" at the second link layer switch "FE2" 12b; the link layer switch "FE1" 12a in response also can selectively disable access by the host network device "H1" 14a using the MAC address "MAC1" on the link-layer connection 20 in the link-layer access network 18a, based on removing in operation 76 the neighbor device entry 44a from its neighbor table 38a, and sending in operation 76 a request that the database 22 delete the MAC address entry 24a (the "MAC1-FE1" entry) that specifies the MAC address "MAC1" is reachable via the link layer switch "FE1" 12a.

If in operation 72 the link layer switch "FE1" 12a receives the response 74 from the host network device "H1" 14a indicating the MAC address "MAC1" is still in use locally on the link-layer connection 20 in the link-layer access network 18a (operation "6" of FIG. 1), the processor circuit 34 of the link layer switch "FE1" 12a in operation 78 (operation "7" and 30 of FIG. 1) can compare whether the specified trust metric "T'" 28b specified in the query message 26 has a higher trust level than the corresponding trust metric "T" 28a for the MAC address "MAC1" specified in the neighbor device entry 44a for the device host network device "H1" 14a using the MAC address "MAC1" on the link-layer connection 20 in the link-layer access network 18a.

For example, the processor circuit 34 of the link layer switch "FE1" 12a in operation 80 can parse the MAC preference value "MAC_P'" from the trust metric "T'" 28b and determine whether the MAC preference value "MAC_P" specified in the neighbor device entry 44a for the trust metric "T" 28a is greater than the MAC preference value "MAC_P'" associated with the trust metric "T'" 28b.

If in operation 80 the processor circuit 34 of the link layer switch "FE1" 12a determines that the MAC preference value "MAC_P" specified in the neighbor device entry 44a for the trust metric "T" 28a is greater than the MAC preference value "MAC_P'" associated with the trust metric "T'" 28b, the processor circuit 34 can determine that the local use of the MAC address "MAC1" by the host network device "H1" 14a has a higher trust level than used at the link layer switch "FE2" 12b: in response to detecting the lower trust level associated with the host network device "H" 14c as a theft of the MAC address "MAC1", the processor circuit 34 of the link layer switch "FE1" 12a can send in operation 82 ("8" of FIG. 1) a reply message (84 of FIG. 1) denying use of the MAC address "MAC1" at the link layer switch "FE2" 12b (the reply message 84 optionally can specify the reason for denial being detecting an untrusted duplicate of the MAC address "MAC1"). The link layer switch "FE2" 12b, in response to reception of the deny message 84, can block the use of the MAC address "MAC1" in the link-layer access network 18b and delete the neighbor device entry 44c from its neighbor table 38b in operation 86 (operation "9" of FIG. 1).

If, however, in operation 88 the processor circuit 34 of the link layer switch "FE1" 12a determines that the MAC preference value "MAC_P" specified in the neighbor device entry 44a for the trust metric "T" 28a is less than the MAC preference value "MAC_P'" associated with the trust metric "T'" 28b, the processor circuit 34 can determine that the local use of the MAC address "MAC1" by the host network device "H1" 14a has a lower trust level than used at the link layer switch "FE2" 12b: in response to detecting the lower trust level associated with the host network device "H1" 14a as a theft of the MAC address "MAC1", the processor circuit 34 of the link layer switch "FE1" 12a can execute operation 76 as described previously.

Hence, in response to determining in operation 88 the MAC preference value "MAC_P'" associated with the specified trust metric "T'" 28b indicates a higher trust level than the corresponding MAC preference value "MAC_P" for the trust metric "T" 28a for the MAC address "MAC1" used by the host network device "H1" 14a on the link layer connection 20 in the link-layer access network 18a, the processor circuit 34 of the link layer switch "FE1" 12a in operation 76 can send to the link layer switch "FE2" 12b a reply that authorizes use of the MAC address "MAC1" at the second link layer switch "FE2" 12b. The link layer switch "FE1" 12a in response also can selectively disable access by the host network device "H1" 14a using the MAC address "MAC1" on the link-layer connection 20 in the link-layer access network 18a, based on removing in operation 76 the neighbor device entry 44a from its neighbor table 38a, and sending in operation 76 a request that the database 22 delete the MAC address entry 24a (the "MAC1-FE1" entry) that specifies the MAC address "MAC1" is reachable via the link layer switch "FE1" 12a.

If in operation 90 the MAC preference level "MAC_P" of the trust metric "T" 28a equals the specified MAC preference level "MAC_P'" for the specified trust metric "T'" 28b, the processor circuit 34 of the link layer switch "FE1" 12a in operation 90 can determine the respective IP preference levels "IP_P" and "IP_P'" (specified in the neighbor device entry 44a and the query message 26, respectively), and determine whether the IP preference level "IP_P" associated with the trust metric "T" 28a is greater than the IP preference level "IP_P'" associated with the trust metric "T'" 28b.

If the processor circuit 34 of the link layer switch "FE1" 12a in operation 90 determines the IP preference level "IP_P" associated with the trust metric "T" 28a is greater than the IP preference level "IP_P'" associated with the trust metric "T'" 28b, the processor circuit 34 of the link layer switch "FE1" 12a can determine the higher IP preference level "IP_P" indicates a higher trust level for the host network device "H1" 14a, and in response execute operation 82 that denies use of the MAC address "MAC1" at the link layer switch "FE2" 12b. If, however, the IP preference level "IP_P" is not greater than the IP preference level "IP_P'", then if in operation 92 the IP preference level "IP_P" is not equal to the IP preference level "IP_P'" (i.e., "IP_P" is less than "IP_P'" indicating the host network device "H" 14c has a higher trust level), then the processor circuit 34 of the link layer switch "FE1" 12a in operation 76 can send to the link layer switch "FE2" 12b a reply that authorizes use of the MAC address "MAC1" at the second link layer switch "FE2" 12b.

If the processor circuit 34 of the link layer switch "FE1" 12a in operation 92 determines the MAC preference level "MAC_P" equals the specified MAC preference level "MAC_P'" and the IP preference level "IP_P" equals the specified IP preference level "IP_P'", the processor circuit 34 of the link layer switch "FE1" 12a in operation 94 can identify the trust metric "T" 28a as having the higher trust level based on determining the corresponding age of the link-layer connection 20 with the host network device "H1" 14a as specified in the neighbor device entry 44a indicates the neighbor device entry 44a is an older address entry for the MAC address "MAC1" than a corresponding age associated with the query message 26 (older neighbor device entries 44 can be favored to improve network stability in an example where a network device 14 "flaps" between link layer access networks 18a and 18b before any update of the database 22 can be completed). Hence, the processor circuit 34 of the link layer switch "FE1" 12a can execute operation 82 (denying use of the MAC address "MAC1" at the link layer switch "FE2" 12b) in response to determining the neighbor device entry 44a is the older relative entry (by the corresponding age parameter specified in the neighbor device entry 44a), or the processor circuit 34 of the link layer switch "FE1" 12a can execute operation 76 (granting use of the MAC address "MAC1" at the link layer switch "FE2" 12b) in response to determining the neighbor device entry 44c is the older relative entry (by the corresponding age parameter specified in the query message 26).

According to example embodiments, link layer switches operating as "fabric edge" (FE) switching devices in a distributed link layer switched data network can verify MAC address ownership of network devices in the distributed link layer switched data network, based on comparison of determined trust metrics. The example embodiments enable MAC address ownership verification in a scalable manner in complex data networks providing distributed link layer services, ensuring a MAC address is not improperly claimed by a network device demonstrating a lower trust level than another network device demonstrating a higher trust level in using the MAC address in the distributed link layer switched data network, while permitting device roaming by a network device having legitimate use of the MAC address.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining, by a link layer switch within a distributed link layer switched data network, a trust metric for a media access control (MAC) address used by a network device on a link layer connection provided by the link layer switch;
   receiving, by the link layer switch, a query originated by a second link layer switch in the distributed link layer switched data network, the query specifying the MAC address and a corresponding specified trust metric; and
   responding to the query, by the link layer switch, based on determining whether the corresponding specified trust metric indicates a higher trust level than the trust metric for the MAC address used by the network device on the link layer connection.

2. The method of claim 1, wherein the responding includes selectively sending a reply that authorizes use of the MAC address at the second link layer switch, and selectively disabling access by the network device using the MAC address on the link layer connection, based on determining the corresponding specified trust metric indicates a higher trust level than the trust metric for the MAC address used by the network device on the link layer connection.

3. The method of claim 1, wherein the responding includes selectively sending a reply that denies use of the MAC address at the second link layer switch based on determining the corresponding specified trust metric indicates a lower or equal trust level relative to the trust metric for the MAC address used by the network device on the link layer connection.

4. The method of claim 1, further comprising storing, by the link layer switch, a device entry within a locally-accessible memory in response to the network device having established the link layer connection with the link layer switch, the device entry comprising the MAC address of the network device, one or more Internet Protocol (IP) addresses used by the network device, and the trust metric of the MAC address used by the network device.

5. The method of claim 4, further comprising registering, by the link layer switch, the MAC address and the one or more IP addresses with a database in the distributed link layer switched data network, enabling the second network device to locate the link layer switch providing the link layer connection to the MAC address.

6. The method of claim 1, wherein the determining of the trust metric is based on a MAC preference level and an Internet Protocol (IP) address preference level, wherein:
the MAC preference level is scored based on how the MAC address is obtained by the network device, an identification of any link layer authentication method for the MAC address, and link-layer policy attributes associated with network device connecting to the link layer switch;
the IP address preference level is based on a determined assignment method for the IP address, an identification of any network layer authentication method for the IP address, and network-layer policy attributes associated with the network device connecting to the link layer switch.

7. The method of claim 6, wherein the determining whether the corresponding specified trust metric indicates a higher trust level comprises:
identifying the trust metric as having the higher trust level based on the MAC preference level being higher than a corresponding specified MAC preference level associated with the corresponding specified trust metric;
if the MAC preference level equals the specified MAC preference level, identifying the trust metric as having the higher trust level based on the IP address preference level being higher than a corresponding specified IP address preference level associated with the corresponding specified trust metric;
if the MAC preference level equals the specified MAC preference level and the IP address preference level equals the specified IP address preference level, identifying the trust metric as having the higher trust level based on the network device determining the network device has an older address entry for the MAC address than a corresponding age associated with the query.

8. The method of claim 1, wherein the determining of the trust metric is based on whether the network device can validate that the network device generated a secure token associated with the MAC address.

9. An apparatus implemented as a physical machine, the apparatus comprising:
non-transitory machine readable media configured for storing executable machine readable code;
a device interface circuit configured for providing a link layer connection for a network device in communication with the apparatus; and
a processor circuit configured for executing the machine readable code, and when executing the machine readable code operable for:
determining, by the apparatus implemented as a link layer switch within a distributed link layer switched data network, a trust metric for a media access control (MAC) address used by the network device on the link layer connection;
receiving a query originated by a second link layer switch in the distributed link layer switched data network, the query specifying the MAC address and a corresponding specified trust metric; and
responding to the query based on determining whether the corresponding specified trust metric indicates a higher trust level than the trust metric for the MAC address used by the network device on the link layer connection.

10. The apparatus of claim 9, wherein the responding includes selectively sending a reply that authorizes use of the MAC address at the second link layer switch, and selectively disabling access by the network device using the MAC address on the link layer connection, based on determining the corresponding specified trust metric indicates a higher trust level than the trust metric for the MAC address used by the network device on the link layer connection.

11. The apparatus of claim 9, wherein the responding includes selectively sending a reply that denies use of the MAC address at the second link layer switch based on determining the corresponding specified trust metric indicates a lower or equal trust level relative to the trust metric for the MAC address used by the network device on the link layer connection.

12. The apparatus of claim 9, wherein the processor circuit is configured for storing a device entry within a locally-accessible memory in response to the network device having established the link layer connection with the apparatus, the device entry comprising the MAC address of the network device, one or more Internet Protocol (IP) addresses used by the network device, and the trust metric of the MAC address used by the network device.

13. The apparatus of claim 12, wherein the processor circuit is configured for registering the MAC address and the one or more IP addresses with a database in the distributed link layer switched data network, enabling the second network device to locate the link layer switch providing the link layer connection to the MAC address.

14. The apparatus of claim 9, wherein the determining of the trust metric is based on a MAC preference level and an Internet Protocol (IP) address preference level, wherein:
the MAC preference level is scored based on how the MAC address is obtained by the network device, an identification of any link layer authentication method for the MAC address, and link-layer policy attributes associated with network device connecting to the link layer switch;
the IP addres preference level is based on a determined assignment method for the IP address, an identification of any network layer authentication method for the IP address, and network-layer policy attributes associated with the network device connecting to the link layer switch.

15. The apparatus of claim 14, wherein the processor circuit is configured for determining whether the corresponding specified trust metric indicates a higher trust level based on:
identifying the trust metric as having the higher trust level based on the MAC preference level being higher than a corresponding specified MAC preference level associated with the corresponding specified trust metric;
if the MAC preference level equals the specified MAC preference level, identifying the trust metric as having the higher trust level based on the IP address preference level being higher than a corresponding specified IP addres preference level associated with the corresponding specified trust metric;
if the MAC preference level equals the specified MAC preference level and the IP address preference level equals the specified IP address preference level, identifying the trust metric as having the higher trust level based on the network device determining the network device has an older address entry for the MAC address than a corresponding age associated with the query.

16. The apparatus of claim 9, wherein the determining of the trust metric is based on whether the network device can validate that the network device generated a secure token associated with the MAC address.

17. One or more non-transitory tangible media encoded with logic for execution by a machine and when executed by the machine operable for:
   determining, by the machine implemented as a link layer switch within a distributed link layer switched data network, a trust metric for a media access control (MAC) address used by a network device on a link layer connection provided by the link layer switch;
   receiving a query originated by a second link layer switch in the distributed link layer switched data network, the query specifying the MAC address and a corresponding specified trust metric; and
   responding to the query based on determining whether the corresponding specified trust metric indicates a higher trust level than the trust metric for the MAC address used by the network device on the link layer connection.

18. The one or more non-transitory tangible media of claim 17, wherein the responding includes selectively sending a reply that authorizes use of the MAC address at the second link layer switch, and selectively disabling access by the network device using the MAC address on the link layer connection, based on determining the corresponding specified trust metric indicates a higher trust level than the trust metric for the MAC address used by the network device on the link layer connection.

19. The one or more non-transitory tangible media of claim 17, wherein the responding includes selectively sending a reply that denies use of the MAC address at the second link layer switch based on determining the corresponding specified trust metric indicates a lower or equal trust level relative to the trust metric for the MAC address used by the network device on the link layer connection.

20. The one or more non-transitory tangible media of claim 17, wherein the determining of the trust metric is based on a MAC preference level and an Internet Protocol (IP) address preference level, wherein:
   the MAC preference level is scored based on how the MAC address is obtained by the network device, an identification of any link layer authentication method for the MAC address, and link-layer policy attributes associated with network device connecting to the link layer switch;
   the IP address preference level is based on a determined assignment method for the IP address, an identification of any network layer authentication method for the IP address, and network-layer policy attributes associated with the network device connecting to the link layer switch.

* * * * *